Oct. 15, 1929.   W. R. BENDY   1,731,809
ROTARY KILN FEED CONTROL SYSTEM
Filed July 1, 1927   3 Sheets-Sheet 2
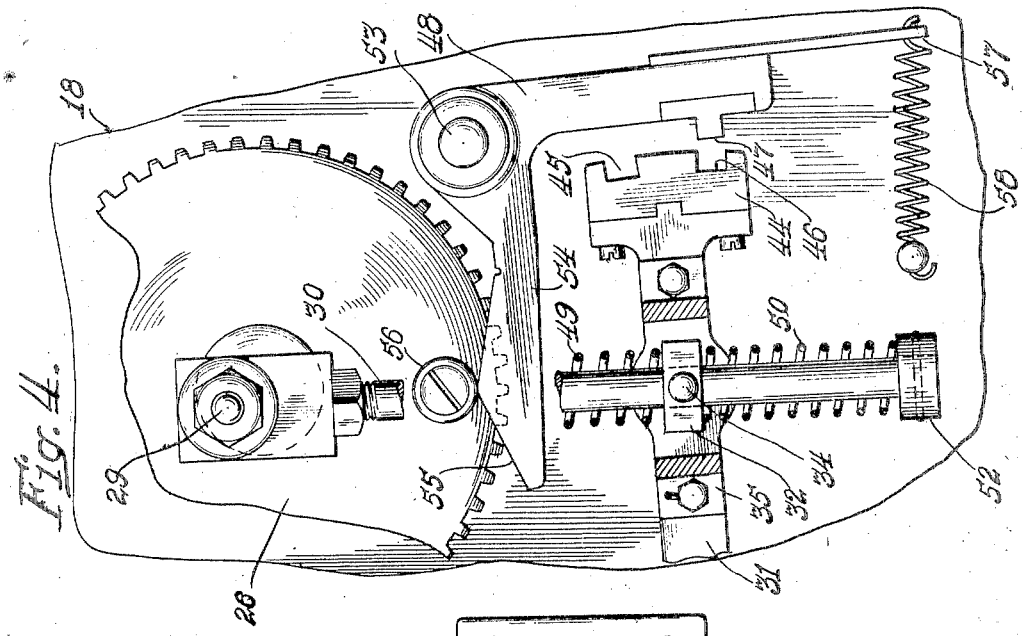
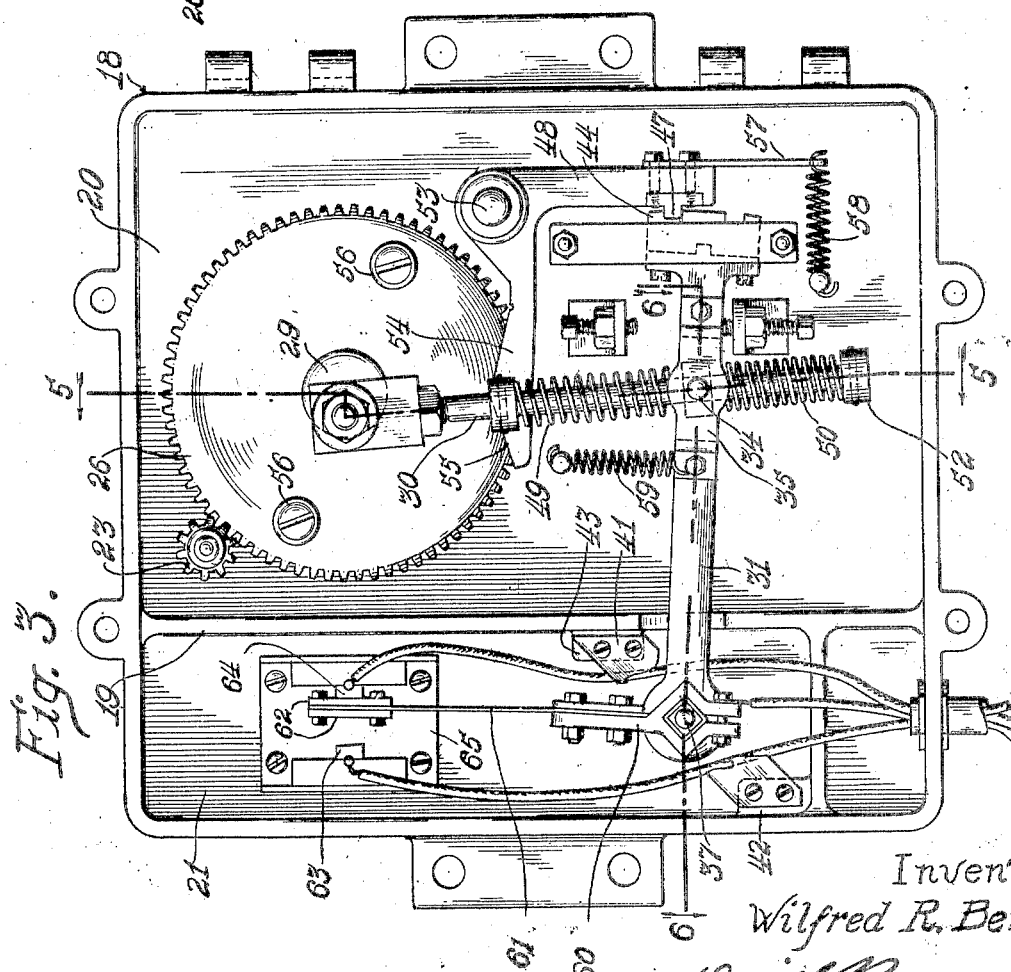
Inventor
Wilfred R. Bendy
Daniel Brennan
Attorney

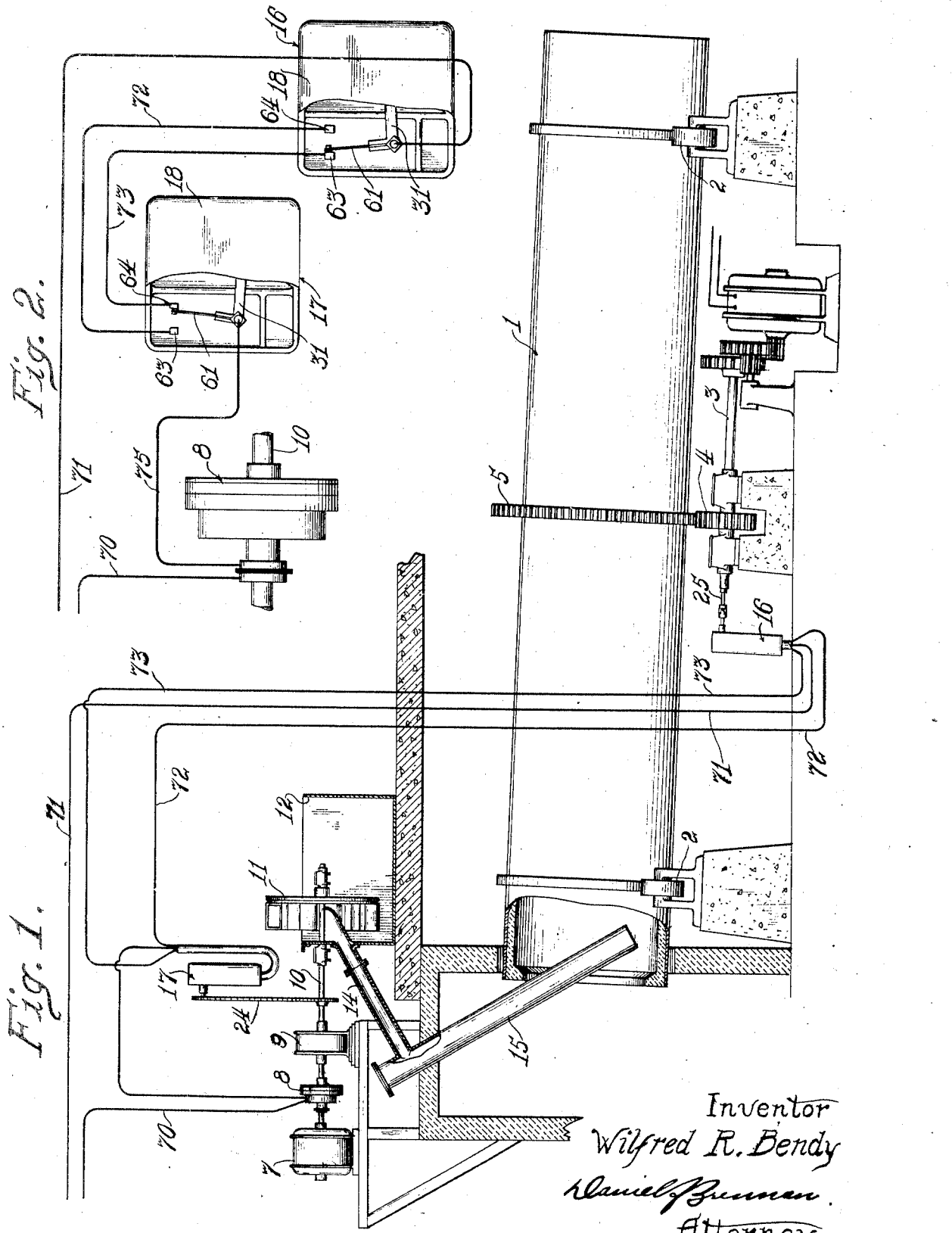

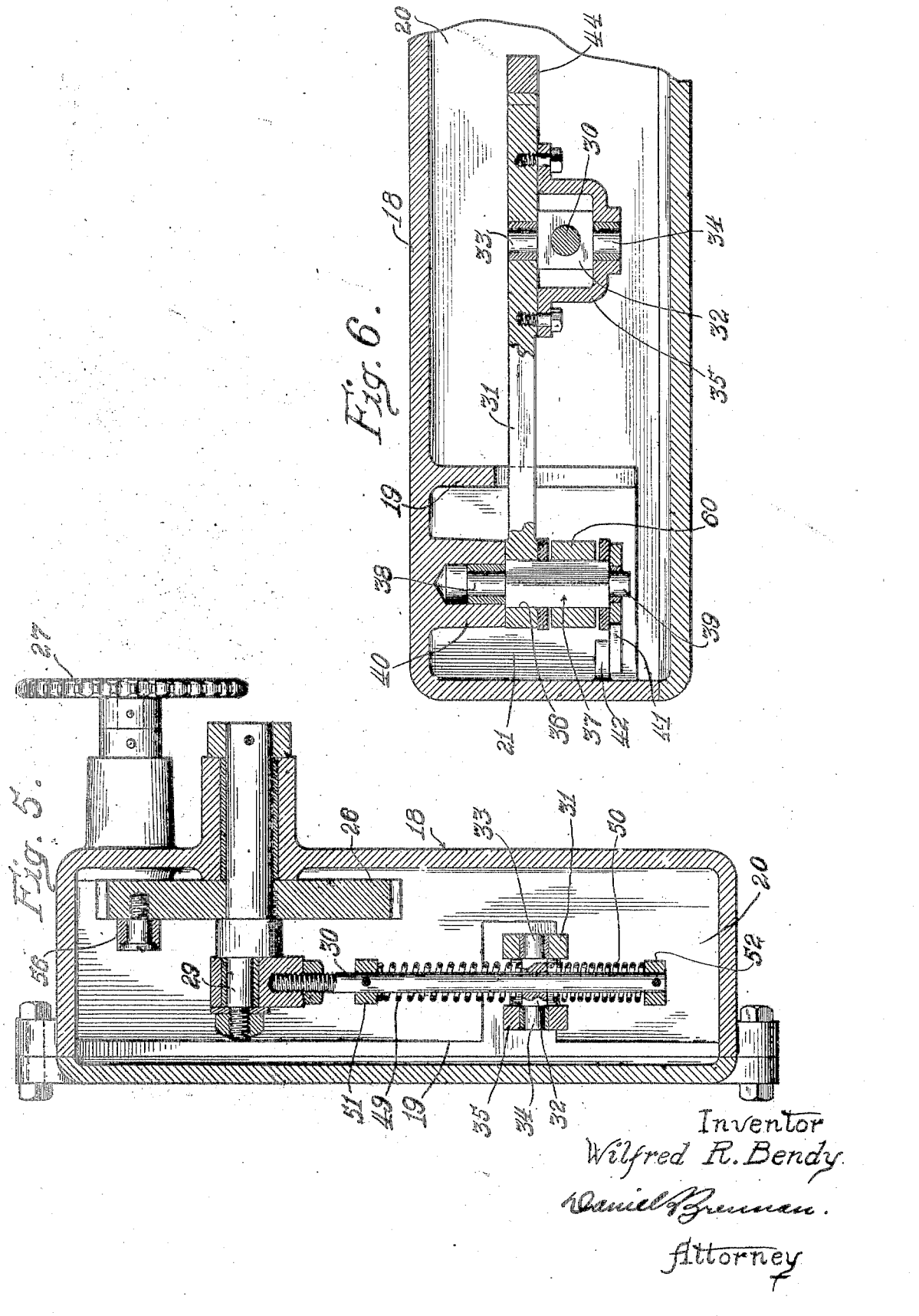

Patented Oct. 15, 1929

1,731,809

UNITED STATES PATENT OFFICE

WILFRED R. BENDY, OF CHICAGO, ILLINOIS

ROTARY-KILN FEED-CONTROL SYSTEM

Application filed July 1, 1927. Serial No. 202,905.

The invention relates to a kiln control, and it is an object of the invention to establish functional uniformity between the feed drive of a kiln and the drive of kiln itself.

In the manufacture of cement or in the conversion of other materials, it has been shown that a kiln, although it may be driven by a constant source of power—varies its rotary speed, depending upon the load or the charge traveling through the same. If, however, upon a variation of this speed the supply of raw material is continued at the same rate as before, the condition of over-charge or under-charge of the kiln will be established. It has been an object of installations in cement factories to attain a proportionate uniformity of the speed of the feed drive with the drive of the kiln. For this purpose expensive and cumbersome transmission systems were installed between the feed drive and the kiln drive, systems which were not only costly, but owing to the length of the kiln and the distance between the points to be controlled were difficult to maintain and gave rise to numerous disturbances in the operation.

It is an object of the present invention to overcome these drawbacks by introducing an electric control system in the drive of the feed and to render this electric control system dependent upon the rate of speed at which the kiln operates.

An object of the invention is to provide a feed control for kilns in which the rate of feed is varied in acordance with the variations in the rate of the kiln operation without, however, necesitating any variation in the running speed of the prime mover driving the feed.

It is furthermore an object of the invention to intermittently interrupt the drive of the feed by varying certain electric connections when for any reason the drive of the kiln is reduced in speed.

Another object of the invention is to provide a kiln control system in which prime mover for the drive of the feed is automatically and intermittently interrupted in accordance with variations in the speed of the kiln, the duration of the periods of interruption varying also in dependence upon the rate of speed of the kiln.

The invention also has the object of intermittently interrupting the driving connection between the feed and its prime mover by releasing a clutch interposed between these two elements of the installation, and the operative or inoperative position respectively of the clutch being partly dependent upon the variations in the drive of the kiln.

This invention also has the object of interrupting a current supply to an electrically operable mechanism in the drive of the feed, the interruption setting in at predetermined times relative to the drive of the feed, and terminating after intervals controlled by the drive of the kiln.

The invention also has the object of providing an electric control system with a rapidly acting automatic switch device for interrupting or establishing respectively certain circuit connections on the feed side of the system.

Another object is to improve the efficiency of kilns in which the speed control for the feed is dependent on the speed control of the kiln, enabling the operator to feed a more constant load to the kiln than would be possible if dependence on his judgment was relied on only.

Another object is to provide a kiln control system in which the amounts of material fed per revolution of the kiln may be definitely fixed and may be changed when necessary without permitting any immediate alterations of the rate of feed.

With these and numerous other objects in view, an embodiment of the system is illustrated in the accompanying drawings, wherein:

Fig. 1 is a diagrammatic section through a kiln drive showing its feed system, certain parts of the installation being shown in elevation;

Fig. 2 is a circuit diagram to illustrate electric connections;

Fig. 3 is a front elevation of a quick acting switch forming part of the installation;

Fig. 4 is a fragmentary front elevation, partly in section, of details of said switch in another position and on a larger scale;

Fig. 5 is a detail sectional view along line 5—5 of Fig. 3, and

Fig. 6 is a detail sectional elevation on line 6—6 of Fig. 3.

The rotary kiln 1 is shown as being supported by bearing rollers 2 in an approved or desired way, and it receives its drive through a shaft 3 carrying a pinion 4 in mesh with the gear rim 5 which is secured about the drum or kiln.

A rotary feed system is shown by way of example in Fig. 1 as being of the type of the Ferris wheel feed, although it is obvious that any other desired type of feed may be employed, and this drive contains an electrically operable mechanism. An electric motor 7, preferably operating at constant speed, drives by means of a clutch 8 a reduction gearing enclosed in a housing 9, the details of which are not of importance for the present application. The driven shaft 10 of the reduction gearing 9 carries the feeding Ferris wheel 11 which is supported to travel through a tank 12 for continuously lifting approximately uniform quantities of the slurry from the tank and depositing the same into the hopper 14 from which a chute 15 delivers this material into the interior of the kiln 1.

For the purpose of automatically controlling the feed, electric means are provided, these electric means being in cooperation, in the present system, with the clutch 8, which may be a magnetic clutch, adapted to enter into operative position when electric current is supplied to a coil, not shown, mounted in one of the clutch elements. Clutches of this type are known, to those skilled in the art, and do not require any detailed description.

The supply of current to this clutch, or the interruption of the current supply respectively, is under the control of a quick acting automatic switch associated with the drive of the kiln and another switch serially connected to the same and located in the drive of the feed. The switches are indicated in general at 16 and 17 respectively, and preferably are of identical construction. In the following specification detailed reference is made, therefore, to one of these switches only.

The switches 16 and 17 each comprise a housing 18 divided by a partition wall 19 into a compartment 20 for the actuating mechanism and a compartment 21 for the switch mechanism proper. The actuating mechanism comprises a pinion 23 suitably supported in the housing and driven in the switch 17 from the shaft 10 by means of a sprocket chain 24 and sprocket 27, while the pinion of the quick acting switch 16 associated with the kiln 1 may be driven by an extension 25 of the drive shaft 3.

The pinion 23 is in driving engagement with a gear 26 supported in the housing 18 and having an eccentric or crank pin 29 to which a crank rod 30 is secured so as to be rotatable thereon. This crank rod 30 is in functional connection intermediate its ends with a connecting lever 31, the connection being effected by a square collar 32 slidable on the crank rod 30. This collar has trunnions 33 and 34 by means of which it is pivotally supported on the lever 31 and on a bracket 35 secured to said lever, Fig. 6.

At a relatively great distance from this connection with the crank rod 30, the lever 31 is pivotally secured near its end to the housing 20, the lever being provided with an opening 36 through which a pin 37 extends, the pin being non-rotatable connected with the lever. Trunnions 38 and 39 respectively projecting from the ends of the pin find their pivotal support in bore 40 of the boss integral with the housing, and in a bearing strap 41 respectively secured to lugs 42 and 43 which also form a part of the housing.

Normally transmission of any movement from the connecting rod 30 to the switch actuating lever 31 is prevented owing to the provision of a locking device which acts upon the switch lever 31 and which in the embodiment illustrated is formed by a head 44 carried at the free end of the lever, and provided with two notches 45 and 46. A tooth 47 is secured to another spring controlled lever 48 and is adapted to enter either of the notches 45 or 46 to hold the lever 31 against movement, while the crank rod 30 slidably extends through the square collar 32 which is rocked in the lever 31 thereby.

The longitudinal displacement of the crank rod 30 relatively to the collar 32 serves for alternately compressing springs 49 and 50 respectively which surround the crank rod 30, and which are interposed between the collar 32 and upper and lower fixed collars 51 and 52 respectively secured to the crank rod 30.

The lever 48 which carries the locking tooth 47 is pivotally mounted in the housing at 53 and is provided with an angular arm 54 having a cam edge 55 adapted to project into the path of either of two rollers or pins 56 secured to the rotary gear 26 at fixed angular spacings. In the illustrated embodiment, these rollers are shown to be spaced 180°. The cam lever 48 also is provided with an extension 57 to which the end of a spring 58 is connected, the opposite end being anchored to a pin projecting from the casing. Upon arrival of one of these rollers 56 in a position to depress the cam edge 55, the lever 48 will be rocked about its pivotal support 53 against the action of the spring 58, and will thereby withdraw the locking tooth 47 from engagement with the notch 45 or 46 respectively in the head 44 of the lever 31. Immediately after the passage of the roller 56 over the cam edge 55, the lever will be returned to the position indicated in Fig. 3 by the spring 58, thereby again presenting the cam edge 55 in the path of the next roller.

Owing to the tension applied to either of the springs 49 or 50 by the crank rod 30, the lever 31 will be rapidly thrown from one terminal position to the opposite terminal position, the upward movement of the lever being supported by another spring 59 connected with the lever 31 and anchored at one end in the casing.

From the above description it will be clear that with each passage of a roller 56 over the cam 55 a sudden reversion of the position of the lever 31 will occur, and that this lever will not be permited to occupy any intermediate position, but that upon arrival of the lever in its terminal position, it will immediately be automatically locked through the entry of the tooth 47 in either one of the notches 45 or 46 at the head of the lever.

The lever 31 is firmly united in the second compartment 21 of the housing with a removable bracket 60 to which the switch blade 61 is secured. The free end of the switch blade carries contact plates 62 adapted to engage stationary contacts 63 and 64 mounted on a suitable insulating block 65 in said compartment. The inclination of the bracket 60 relatively to the lever 31 is such that the switch blade 61 is forced under tension against the respective contact against which it rests, so as to maintain suitable conductive engagement with the respective contact.

The two automatic switches 16 and 17 are serially connected in the electric current, as illustrated in Figures 1 and 2. It will be seen that of the conductors 70 and 71 supplying the current to the control system, one is connected to the electrically operable mechanism, namely the clutch 8, (which clutch usually contains an energizing coil), while the other conductor leads to the switch blade 61 of the switch 16 which is associated with the kiln drive. The contacts 63 and 64 of the kiln drive switch 16 are connected with the corresponding contacts 64 and 63 respectively of the switch 17 for the feed drive by the conductors. The outgoing lead 75 from the energizing coil of the clutch is attached to the blade 61 of the feed drive switch 17.

The current, therefore, (Fig. 2) flows through conductor 70, clutch 8, conductor 75, switch blade 61 for the feed switch 17, contact 64, and from there through the conductor 73, contact 63, switch blade 61 of the kiln drive switch 16 and back through conductor 71.

If for any reason whatsoever the position of either of these blades 61 is altered, while the other remains in its position, the current supply to the electrically operable mechanism will be interrupted. This may occur, for instance when—owing to the constant speed drive of the feed switch 17, the blade 61 of the same is thrown into engagement with the stationary contact plate 63 while the switch blade 61 of the kiln drive switch 16 remains still in engagement with its contact 63. This will occur when for instance the load on the kiln is so heavy that rotation of the same is retarded relatively to the normal speed. The proper relation for the supply of current to the clutch 8 will only be resumed when the kiln drive switch 16 in the continued operation of the kiln is moved through rotation of the gear 4 to conductive position with respect to the contact 64, in which case, the current supply for the clutch 8 is again established and the drive of the feed again is initiated.

The speed relations are such that when the kiln 1 is operating at the maximum speed for which it is designed, the feeder will operate at a speed about ten per cent higher than would be the case in the usual installation. The switches govern the operation of the magnetic clutch, and hence, although the feeder operates at a fixed speed when running, this feed is interrupted for periods of a length dependent upon the speed of the kiln, and hence the feed makes a certain predetermined number of revolutions for each revolution of the kiln, whatever the speed of the latter may be. The maximum kiln speed may for instance be two revolutions per minute, and the ratio of kiln speed to feeder speed may be 1 to 10. Therefore, when the kiln is operating at full speed, two revolutions per minute, the feeder will revolve twenty times within the period of one minute, but of this period of one minute, fifty-four seconds only are used by the running period of the feeder, and during the remainder, of six seconds of this period, the feeder is at rest. When the kiln is operating at half speed, or one revolution per minute, the feeder will revolve twenty times in two minutes, but of this period of two minutes, fifty-four seconds only are used by the running period, and it will remain at rest for the remainder of sixty-six seconds.

From the above description, it will be obvious that in this control system, the necessity of cumbersome connections between the drives of the kiln and feeder are entirely obviated, that in spite of this condition, however, a proportionate control of the feed in respect of the drive of the kiln is obtained, and that the prime mover for the feed may be a continuous uniform speed motor of standard construction running at the desired speed all the time. It is, furthermore, obvious however, that instead of a motor running at practically uniform speed continually and effecting the drive of the feeder through the interposition of a clutch, the switch connection may be placed in the leads connecting the motor with the supply, and that, therefore the drive of the motor may be interrupted at intervals. The claims are contemplated to include any intermittent interruption of the current supply to an electrically operable mechanism in the drive of the feed.

Claims:

1. A kiln feed control comprising an electrically operable mechanism in the drive of the feed and mechanically actuated by said drive, and electrical means mechanically actuated by the drive of the kiln for varying the termination of intervals of energization of said electrically operable mechanism in predetermined relation to the speed of the kiln.

2. A kiln feed control, including a feed drive and a kiln drive, the feed drive being operable at a fixed speed, and electrically operated means mechanically associated with said feed drive and said kiln drive for interrupting the drive of the feed for intervals of time determined by the variation of the rotary speed of the kiln.

3. A kiln feed control, comprising a motor driving the feeder, a clutch on the feeder drive shaft interposed between said motor and feeder, a drive for the kiln, and means mechanically controlled by the speed of the kiln for intermittently rendering said clutch inoperative.

4. A kiln feed control, comprising an electrically operable mechanism for the feed drive and mechanically associated with said drive, and electrically operated means in the drive of the kiln and mechanically controlled by the kiln for intermittently interrupting the current supply to said electrically operable mechanism.

5. A kiln feed control, comprising a feeder, an electrically operable mechanism in the feeder drive, and means in the drive of the feeder for intermittently interrupting the current supply to said electrically operated mechanism.

6. A kiln feed control, comprising a feeder, an electrically operable mechanism in the drive of the same, means in the drive of the feeder for intermittently interrupting the current supply to said electrically operable mechanism, and means in the drive of the kiln for reestablishing the current supply to said electrically operable mechanism.

7. A kiln feed control, comprising a feeder, an electrically operable mechanism in the drive of the same, means in the drive of the feeder for interrupting the current supply to said electrically operable mechanism at predetermined intervals, and means in the drive of the kiln for reestablishing the current supply to said electrically operable mechanism, said last named means being dependent in their operation upon the speed of the kiln.

8. A kiln feed control, comprising a switch actuated by the drive of the kiln, an electrically operable mechanism in the drive of the feed, and a switch actuated thereby and serially connected with said first named switch in such manner that current can be supplied to the electrically operable mechanism only when each of said switches is in a predetermined position.

9. A kiln feed control, including a drive for the feed containing electrically operable mechanism, a switch in the current supply of said mechanism, another switch serially connected with said first named switch in the drive of the kiln, and means for rapidly actuating each of said switches independently of the other by the drive pertaining to the same.

10. A kiln feed control comprising a feed drive with an electrically operable mechanism, a switch in the current supply of the electrically operable mechanism and containing a rotary switch actuating member, a switch lever associated with said rotary switch actuating member, means for locking the switch lever against movement, and means under control of said rotary switch actuating member for releasing said switch lever.

11. A kiln feed control comprising a kiln feed drive containing electrically operable mechanism, a switch in the current supply for said mechanism, a rotary switch actuating member driven by the feed drive, a switch lever, means independent of said rotary actuating member for locking the switch lever against movement, means under control of said rotary switch actuating member for releasing the switch lever from the lock, and independent means for rapidly actuating said switch lever to change its position relatively to the current supply.

12. A kiln feed control comprising a feed drive with an electrically operable mechanism, a switch in the current supply of said electrically operable mechanism, a rotary switch actuating member operated by said drive, a switch lever under control of said actuating mechanism, a locking device for said switch lever, means under control of the rotary actuating mechanism for intermittently releasing said locking device, means for throwing the switch lever from one terminal position to another terminal position upon release, and independent means for returning the locking device to operative position in the new position of said switch lever.

13. A kiln feed control comprising a motor driving the feeder, means for driving the kiln and mechanisms mechanically associated with both of said driving means and dependent upon the speed of the kiln for varying the drive of the feeder in predetermined relation to the rotary speed of the kiln.

14. A kiln feed control, comprising in association with the driving means for the feeder and in association with the driving means for the kiln, automatic electric means directly connected mechanically to said two driving means respectively, for varying the interval of operation of the feeder in predetermined relation to the rotary speed of the kiln.

15. A kiln feed control comprising in combination with the drive of the kiln, an electrically operable mechanism in the drive of the feeder, directly connected mechanically with said drive, and means for varying the operation of said electrically operable mechanism in accordance with the rotary feed of the kiln.

16. A kiln feed control comprising in direct mechanical connection with the drive of the feed, an electrically operable mechanism and kiln actuated means depending upon the rotary speed of the kiln and electrically associated with said mechanism for varying the intervals of energization of said electrically operable mechanism.

In testimony whereof I affix my signature at 10 South La Salle Street, Chicago, Illinois.

WILFRED R. BENDY.